(12) United States Patent
Kitaoka et al.

(10) Patent No.: US 10,429,562 B2
(45) Date of Patent: Oct. 1, 2019

(54) ILLUMINATION APPARATUS

(71) Applicant: PANASONIC INTELLECTUAL PROPERTY MANAGEMENT CO., LTD., Osaka (JP)

(72) Inventors: Shinichi Kitaoka, Osaka (JP); Hideharu Kawachi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 130 days.

(21) Appl. No.: 15/480,625

(22) Filed: Apr. 6, 2017

(65) Prior Publication Data

US 2017/0293062 A1 Oct. 12, 2017

(30) Foreign Application Priority Data

Apr. 12, 2016 (JP) .................................. 2016-079928

(51) Int. Cl.
| | | |
|---|---|---|
| *F21V 8/00* | (2006.01) | |
| *A47F 11/10* | (2006.01) | |
| *G02B 6/42* | (2006.01) | |
| *G09F 13/18* | (2006.01) | |

(52) U.S. Cl.
CPC ............ *G02B 6/0006* (2013.01); *A47F 11/10* (2013.01); *G02B 6/4206* (2013.01); *G02B 6/4212* (2013.01); *G02B 6/4268* (2013.01); *G09F 13/18* (2013.01)

(58) Field of Classification Search
CPC ....... A47F 11/10; G09F 13/18; G06B 6/4206; G06B 6/4212; G06B 6/4268; G06B 6/0006; G02B 6/0006; G02B 6/4206; G02B 6/4212; G02B 6/4268
See application file for complete search history.

(56) References Cited

U.S. PATENT DOCUMENTS

| | | | | |
|---|---|---|---|---|
| 2009/0237940 A1* | 9/2009 | Wu | ........................ | F21K 9/233 362/280 |
| 2014/0160782 A1* | 6/2014 | Harada | ................... | F21V 5/008 362/538 |

(Continued)

FOREIGN PATENT DOCUMENTS

JP 2015-015146 1/2015

*Primary Examiner* — Anh T Mai
*Assistant Examiner* — Nathaniel J Lee
(74) *Attorney, Agent, or Firm* — Greenblum & Bernstein, P.L.C.

(57) ABSTRACT

An illumination apparatus, which is to be connected to a light source apparatus that generates laser light and which is to be attached to an optical cable that guides the laser light, is provided. The illumination apparatus includes a light-emitting module which is to be attached to a tip portion of the optical cable. The light-emitting module receives the laser light emitted from the optical cable, converts the laser light into light having a different wavelength of a predetermined color, and emits the light. A heat dissipating lens case includes a lens and dissipates heat generated by the light-emitting module. The lens controls distribution of the light emitted by the light-emitting module. The heat dissipating lens case includes an attachment structure which allows the heat dissipating lens case to be removably attached to the light-emitting module.

17 Claims, 9 Drawing Sheets

(56) References Cited

U.S. PATENT DOCUMENTS

| | | | |
|---|---|---|---|
| 2016/0084451 A1* | 3/2016 | Annen | G02B 6/0006 362/553 |
| 2016/0146415 A1* | 5/2016 | Suzuki | G02B 6/0006 362/553 |
| 2017/0108182 A1 | 4/2017 | Nakano | |

* cited by examiner

ILLUMINATION APPARATUS

CROSS REFERENCE TO RELATED APPLICATION

This application claims the benefit of priority of Japanese Patent Application Number 2016-079928 filed on Apr. 12, 2016, the entire content of which is hereby incorporated by reference.

BACKGROUND

1. Technical Field

The present disclosure relates to an illumination apparatus which uses laser light emitted by a light source.

2. Description of the Related Art

Conventionally, an illumination apparatus is known which emits light using a phosphor excited by laser light to convert the laser light into light of a desired color (see Japanese Unexamined Patent Application Publication No. 2015-15146, for example). With such an illumination apparatus, laser light from a light source is guided to the body of the illumination apparatus (hereinafter referred to as the illumination apparatus body) via an optical fiber cable. The laser light passing through the optical fiber cable excites the phosphor in the illumination apparatus body, so that light of a desired color is emitted from the illumination apparatus body. The illumination apparatus body includes a heat dissipater to dissipate heat generated by the phosphor emitting light.

SUMMARY

When the illumination apparatus is installed in, for example, a building structure, the optical fiber cable is conceivably routed in the building structure with the illumination apparatus body having been mounted. Thus, the illumination apparatus body is susceptible to the restriction of the building structure if the illumination apparatus body is large, thus causing a decrease in the work efficiency. To overcome this, one may consider downsizing the illumination apparatus body; however, the heat dissipater would also be downsized and it would not be possible to achieve desired heat dissipation performance.

In view of the above, an object of the present disclosure is to provide an illumination apparatus that increases the workability at the time of installation, while ensuring the heat dissipation performance.

As described above, an illumination apparatus according to an aspect of the present disclosure is an illumination apparatus which is to be connected to a light source apparatus that generates laser light and which is to be attached to an optical cable that guides the laser light, the illumination apparatus including: a light-emitting module which is to be attached to a tip portion of the optical cable, receives the laser light emitted from the optical cable, converts the laser light into light having a different wavelength of a predetermined color, and emits the light; and a heat dissipating lens case which holds a lens and dissipates heat generated by the light-emitting module, the lens controlling distribution of the light emitted by the light-emitting module, wherein the heat dissipating lens case has an attachment structure which allows the heat dissipating lens case to be removably attached to the light-emitting module.

According to the present disclosure, it is possible to provide an illumination apparatus that, increases the workability at the time of installation, while ensuring the heat dissipation performance.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT(S)

Hereinafter, an illumination apparatus according to an embodiment of the present disclosure will be described with reference to the drawings. It should be noted that the embodiment described below is to show a specific example of the present disclosure. Therefore, the numerical values, shapes, materials, structural elements, and the arrangement and connection of the structural elements, etc., shown in the following embodiment are mere examples, and are therefore not intended to limit the present disclosure. As such, among the structural elements in the following embodiment, elements not recited in any one of the independent claims indicating the broadest inventive concepts will be described as arbitrary structural elements.

It should also be noted that each drawing is a schematic illustration and not necessarily a precise illustration. Furthermore, in the drawings, like reference signs are given to like structural elements.

Embodiment

Hereinafter, an embodiment will be described.
[Use of Illumination Apparatus]
First, a use of an illumination apparatus according to an embodiment will be described.

Figure 1:
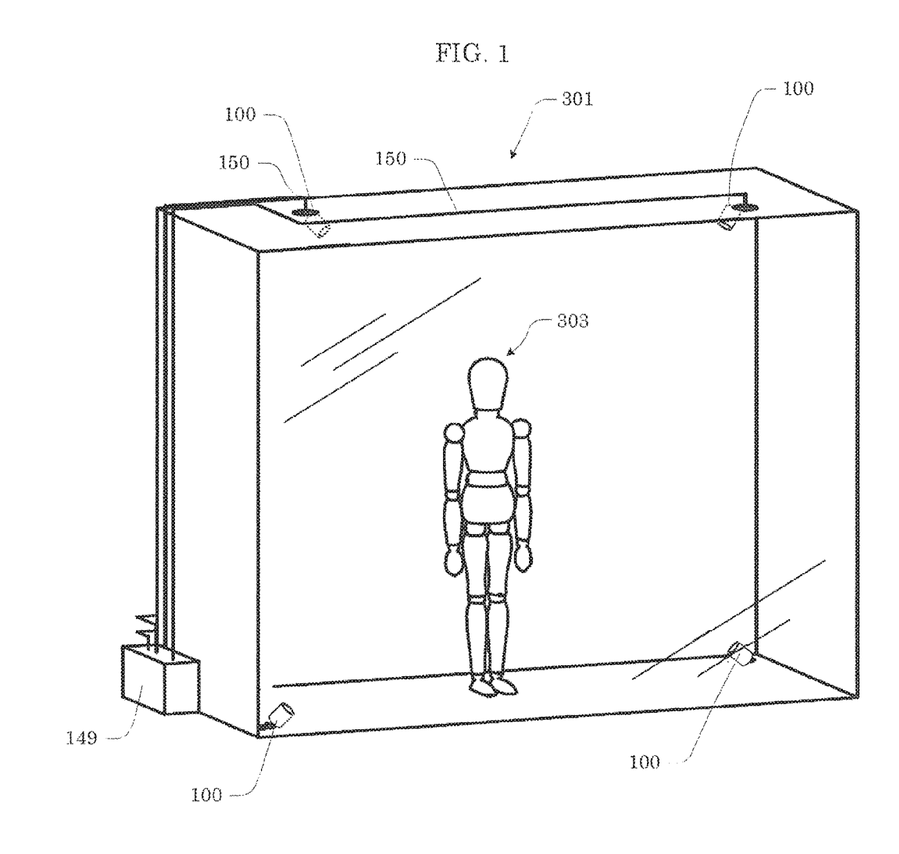
FIG. 1 is a perspective view illustrating a use of an illumination apparatus according to an embodiment.

FIG. 1 is a perspective view illustrating a use of an illumination apparatus according to an embodiment.

As illustrated in FIG. 1, a plurality of illumination apparatuses 100 are installed on the ceiling and the floor of shop window 301 which is an example of a building structure, and each illumination apparatus 100 functions as a spotlight that illuminates mannequin 303. Light source apparatus 149 is provided outside shop window 301 to generate laser light. The laser light emitted by light source apparatus 149 is transmitted to each illumination apparatus 100 by optical cable 150 wired outside shop window 301. Optical cable 150 is an optical fiber cable that guides laser light, and is optical fiber 151 covered with protective sheath 152 (see FIG. 3).

Light source apparatus 149 generates laser light and supplies the laser light to the plurality of illumination apparatuses 100 through optical cable 150. Specifically, light source apparatus 149 includes a plurality of semiconductor laser elements which emit laser light having a wavelength in a range from the wavelength of blue-violet light to the wavelength of blue light (i.e., 430 nm to 490 nm), for example. By disposing the semiconductor laser elements at one position, a cooling apparatus which cools the semiconductor laser elements can be centrally provided, thereby increasing the cooling efficiency and enabling use of exhaust heat and the like for heating water, for example.

Each illumination apparatus 100 emits white light using the laser light transmitted through optical cable 150 as excitation light.

[Configuration of Illumination Apparatus]

Hereinafter, a configuration of illumination apparatus 100 will be described.

Figure 2:
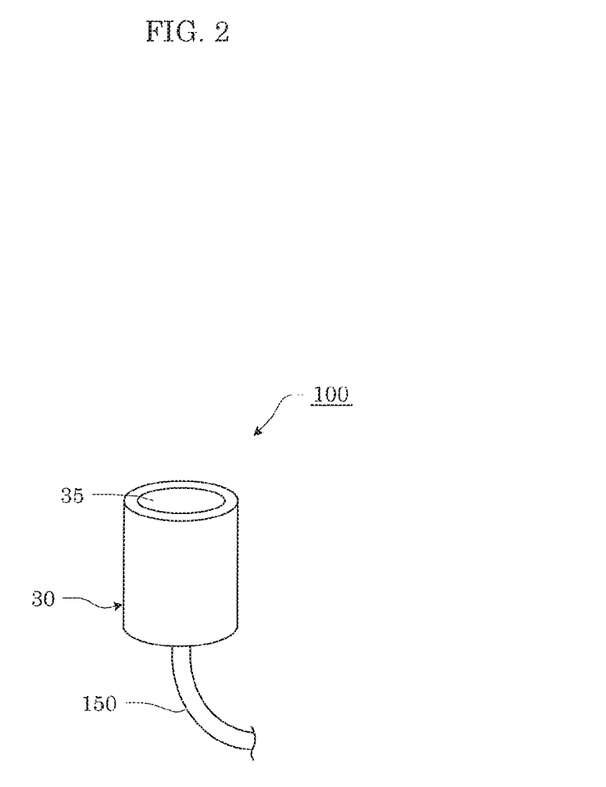
FIG. 2 is a perspective view illustrating a schematic configuration of an illumination apparatus according to an embodiment.
Figure 3:
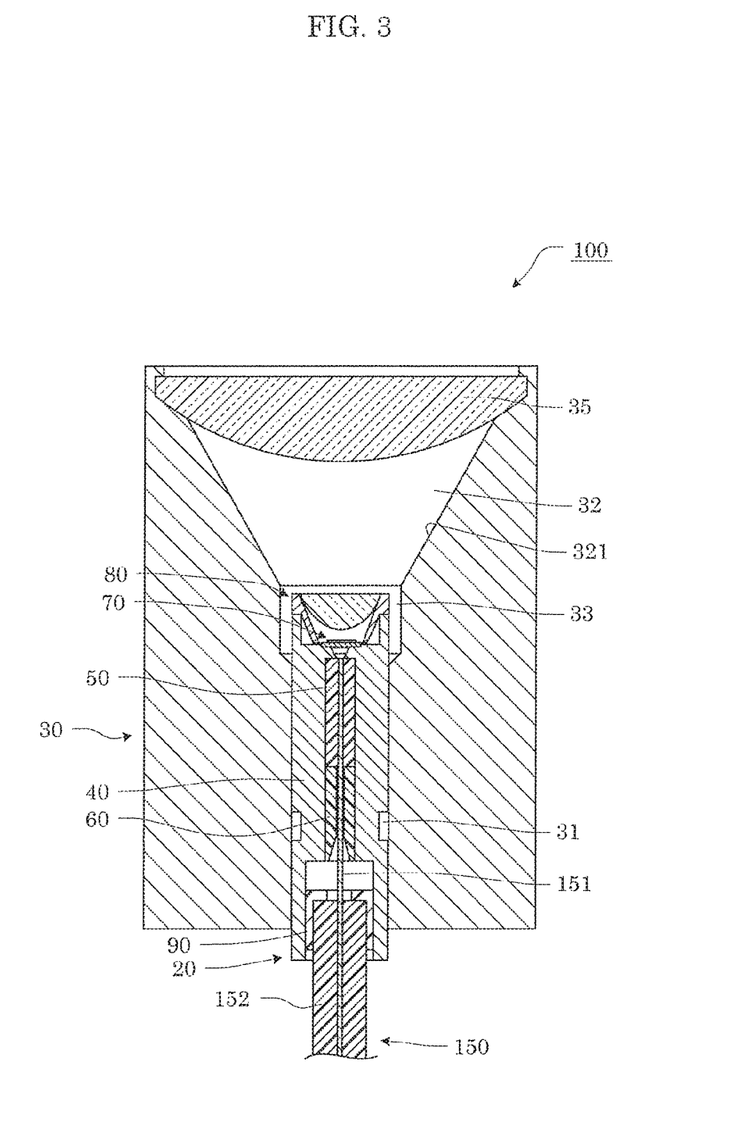
FIG. 3 is a cross sectional view illustrating a schematic configuration of an illumination apparatus according to an embodiment.

FIG. 2 is a perspective view illustrating a schematic configuration of illumination apparatus 100 according to an embodiment. FIG. 3 is a cross sectional view illustrating a schematic configuration of illumination apparatus 100 according to an embodiment.

As illustrated in FIG. 2 and FIG. 3, illumination apparatus 100 includes light-emitting module 20 and heat dissipating lens case 30. Heat dissipating lens case 30 is removably attached to light-emitting module 20.

[Light-Emitting Module]

Figure 4:
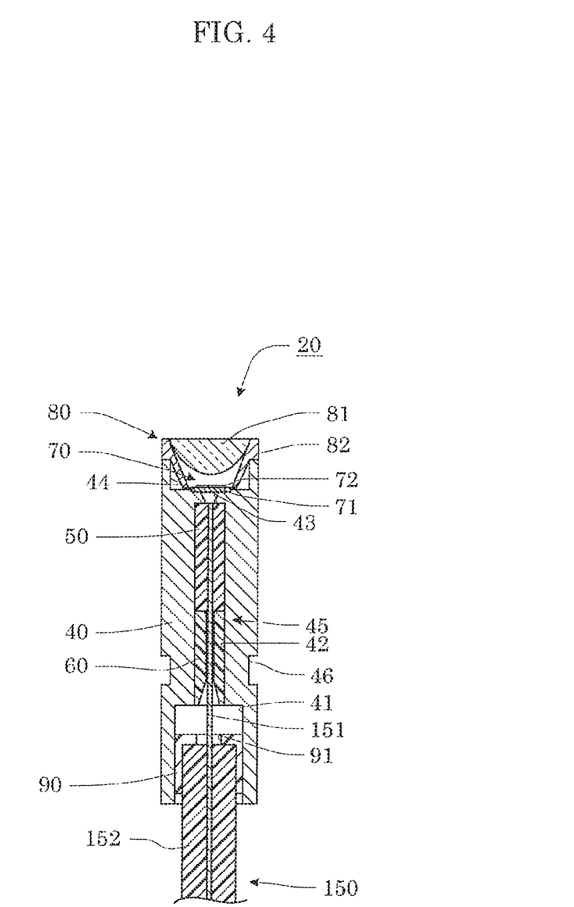
FIG. 4 is a cross sectional view illustrating a schematic configuration of a light-emitting module according to an embodiment.

FIG. 4 is a cross sectional view illustrating a schematic configuration of light-emitting module 20 according to an embodiment.

As illustrated in FIG. 3 and FIG. 4, light-emitting module 20 includes housing 40, ferrule 50, engager 60, light emitter 70, lens holder 80, and cable holder 90.

Housing 40 is a tubular housing to which a tip portion of optical cable 150 is attached. Housing 40 is formed using, for example, a metal having relatively high thermal conductivity, such as aluminum or copper.

Through-hole 45, in which first hole portion 41, second hole portion 42, third hole portion 43, and fourth hole portion 44 are arranged in this order from a first end portion of housing 40, is formed in housing 40. First hole portion 41, second hole portion 42, third hole portion 43, and fourth hole portion 44 are arranged along the same axis.

First hole portion 41 is a cylindrical opening larger than second portion 42 in diameter, and is formed in a first end surface of housing 40. The tip portion of optical cable 150 is disposed in first hole portion 41 via cable holder 90.

Second hole portion 42 is a cylindrical opening smaller than first hole portion 41 in diameter, and is located between first hole portion 41 and third hole portion 43. Optical fiber 151 protruding from a tip surface of protective sheath 152 is inserted into second hole portion 42 via ferrule 50 and engager 60.

Third hole 43 is located between second hole portion 42 and fourth hole portion 44, and is a truncated conical opening having a small diameter portion on the side closer to second hole portion 42 and a large diameter portion on the side closer to fourth hole portion 44. Light emitter 70 is provided to block the large diameter portion of third hole portion 43.

Fourth hole portion 44 is a cylindrical opening larger than third hole portion 43 in diameter, and is formed in a second end surface of housing 40. Lens holder 80 is disposed in fourth hole portion 44.

Depression 46 is continuously formed on the outer peripheral surface of housing 40, along the entire perimeter. Depression 46 is used for engaging later-described protective cap 200 (see FIG. 7, for example) with housing 40.

Ferrule 50 is a tubular component attached to optical fiber 151 protruding from protective sheath 152. Ferrule 50 is formed using a material such as stainless steel, ceramics, or resin, for example. Specifically, ferrule 50 is attached to a tip portion of optical fiber 151 in a manner that the tip end surface of ferrule 50 and the tip end surface of optical fiber 151 lie in the same plane. When ferrule 50 is inserted into second hole portion 42, the tip end surface of optical fiber 151 is opposed to light emitter 70 via third hole portion 43. That is to say, laser light emitted from the tip end surface of optical fiber 151 reaches light emitter 70 via third hole portion 43.

Engager 60 is a tubular component engaged with second hole portion 42 to reduce disconnection of ferrule 50. Engager 60 is formed using metal or resin, for example. Specifically, optical fiber 151 between ferrule 50 and protective sheath 152 is inserted through engager 60. This allows engager 60 to make a movement relative to optical fiber 151. Furthermore, engager 60 reduces disconnection of ferrule 50 from second hole portion 42, by fitting into second hole portion 42 after ferrule 50 is disposed in second hole portion 42.

Light emitter 70 is an optical element which receives laser light passing through third hole portion 43, converts the laser light into light having a different wavelength of a predetermined color, and emits the light. Light emitter 70 is disposed and fixed at the bottom surface of fourth hole portion 44 to cover third hole portion 43. Since light emitter 70 is in contact with housing 40, heat from light emitter 70 is conducted to housing 40.

Light emitter 70 includes substrate 71 and phosphor component 72.

Substrate 71 is a plate mounted on the bottom surface of fourth hole portion 44, with phosphor component 72 held on substrate 71. For example, substrate 71 is formed using a light-transmissive material such as glass or sapphire. Substrate 71 is formed into a rectangular plate shape. An example of substrate 71 is a plate that is square when viewed along the optical axis. Phosphor component 72 is stacked on the main surface of substrate 71 facing outside.

For example, phosphor component 72 includes, in a dispersed manner, phosphor particles that emit fluorescence when excited by laser light, and the phosphors emit fluorescence when irradiated with the laser light. Thus, the main surface of phosphor component 72 facing outside is the light-emitting surface. Specifically, examples of phosphor component 72 include solidified phosphor particles and a base material made of a transparent resin or glass in which phosphor particles are dispersed. That is to say, phosphor component 72 can be considered as a wavelength conversion component which converts laser light into fluorescence. Phosphor component 72 is formed as a plate that is circular when viewed along the optical axis, and is stacked on substrate 71.

In the present embodiment, phosphor component 72 emits white light and includes the following three types of phosphors at appropriate proportions: first phosphors which emit red light when irradiated with the laser light, second phosphors which emit blue light when irradiated with the laser light, and third phosphors which emit green light when irradiated with the laser light.

Although the types and characteristics of the phosphors are not particularly limited, phosphors may have high heat resistance because relatively intense laser light is used as the excitation light. Although the type of the base material holding the phosphors in a dispersed manner is not particularly limited, the base material may have high transparency because high transparency increases the efficiency of white light emission. Furthermore, the base material may have high heat resistance because relatively intense laser light enters the base material.

Lens holder 80 is a tubular component that holds first lens 81 that diffuses the light emitted by light emitter 70. Lens holder 80 is formed using metal or resin, for example. Along the entire perimeter, lens holder 80 includes flange 82 that overlaps with the second end surface of housing 40. The outside diameter of flange 82 is the same as the outside diameter of housing 40, and the outer peripheral surface of flange 82 and the outer peripheral surface of housing 40 lie in the same plane along the entire perimeter.

Furthermore, lens holder 80 has a tapered inner peripheral surface. First lens 81 is disposed and fixed in the space defined by the inner peripheral surface. Lens holder 80 is attached to a second end portion of housing 40 by being partially housed in fourth hole portion 44. This allows first lens 81 held by lens holder 80 to be opposed to tight emitter 70. Thus, the light from light emitter 70 enters first lens 81 either directly or by reflecting off the inner peripheral surface of lens holder 80, and is diffused and released from first lens 81.

Cable holder 90 is a bottomed tubular component that holds a tip portion of optical cable 150. Cable holder 90 is formed using metal or resin, for example. A tip portion of protective sheath 152 is inserted and fitted into cable holder 90. Through-hole 91, through which optical fiber 151 protruding from protective sheath 152 passes, is formed in a bottom portion of cable holder 90. Cable holder 90 is inserted and fitted into first hole portion 41 of housing 40.

[Heat Dissipating Lens Case]

Figure 5:
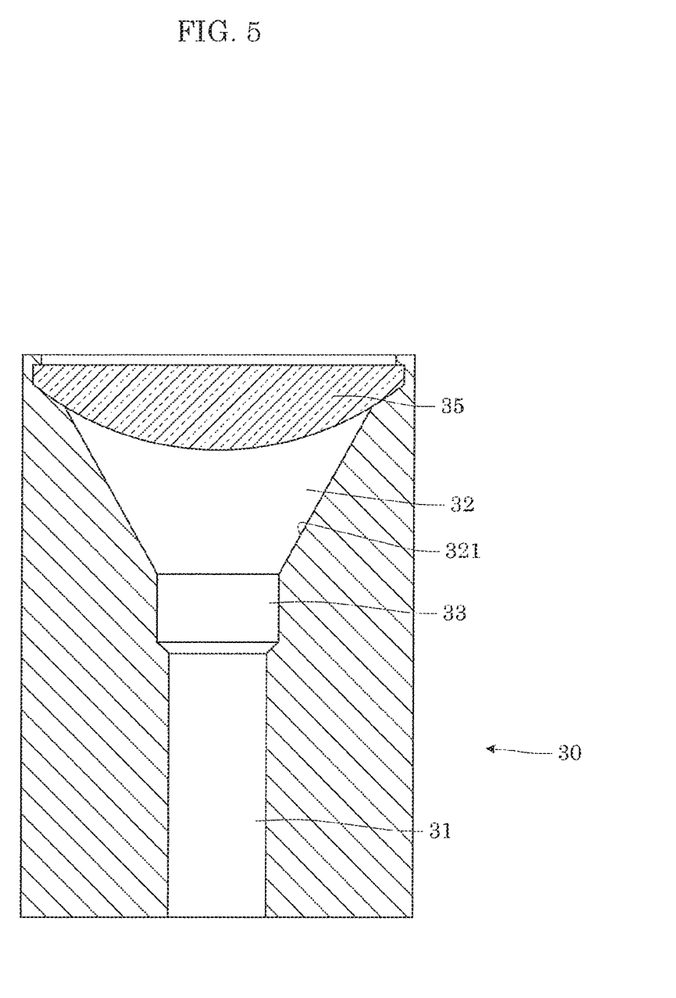
FIG. 5 is a cross sectional view illustrating a schematic configuration of a heat dissipating lens case according to an embodiment.

FIG. 5 is a cross sectional view illustrating a schematic configuration of heat dissipating lens case 30 according to an embodiment.

As illustrated in FIG. 3 and FIG. 5, heat dissipating lens case 30 holds second lens 35 that controls distribution of light emitted by light-emitting module 20. Heat dissipating lens case 30 also dissipates heat generated by light-emitting module 20. Heat dissipating lens case 30 is formed using, for example, a metal having relatively high thermal conductivity, such as aluminum or copper. Heat dissipating lens case 30 includes attachment hole portion 31 to which light-emitting module 20 is attached, lens holding hole portion 32 in which second lens 35 is held, and intermediate hole portion 33 which allows communication between attachment hole portion 31 and lens holding hole portion 32.

Attachment hole portion 31 is a cylindrical opening formed in a first end surface of heat dissipating lens case 30. Light-emitting module 20 and heat dissipating lens case 30 are removably attached by inserting light-emitting module 20 into attachment hole portion 31. Specifically, attachment hole portion 31 has such an inside diameter that allows light-emitting module 20 and heat dissipating lens case 30 to removably fit to each other. That is to say, attachment hole portion 31 is an example of an attachment structure which allows heat dissipating lens case 30 to be removably attached to light-emitting module 20.

When light-emitting module 20 is fitted into attachment hole portion 31, light-emitting module 20 and heat dissipating lens case 30 come into close contact with each other. This allows the heat from light-emitting module 20 to be conducted to and released from heat dissipating lens case 30.

Lens holding hole portion 32 is a substantially truncated cone-shaped opening formed in a second end surface of heat dissipating lens case 30. Second lens 35 is held inside lens holding hole portion 32 on the second end portion side of lens holding hole portion 32. Here, second lens 35 is a light distribution control lens that controls distribution of the light emitted from light emitter 70. Second lens 35 is opposed to light emitter 70. Inner peripheral surface 321 defining lens holding hole portion 32 is a tapered surface having a diameter greater at the second end side than at the first end side. This allows a portion of the light released from light-emitting module 20 to reflect off inner peripheral surface 321 and reach second lens 35.

Intermediate hole portion 33 is a substantially cylindrical opening which allows communication between attachment hole portion 31 and lens holding hole portion 32. A first end portion of intermediate hole portion 33 has a taper-down shape. Intermediate hole portion 33, attachment hole portion 31, and lens holding hole portion 32 are arranged along the same axis.

To combine heat dissipating lens case 30 and light-emitting module 20, the worker inserts and fits light-emitting module 20 into attachment hole portion 31. Light-emitting module 20 is merely fit into attachment hole portion 31. Thus, the relative positional relationship between light-emitting module 20 and heat dissipating lens case 30 can be adjusted by the worker pushing or pulling light-emitting module 20.

Figure 6:
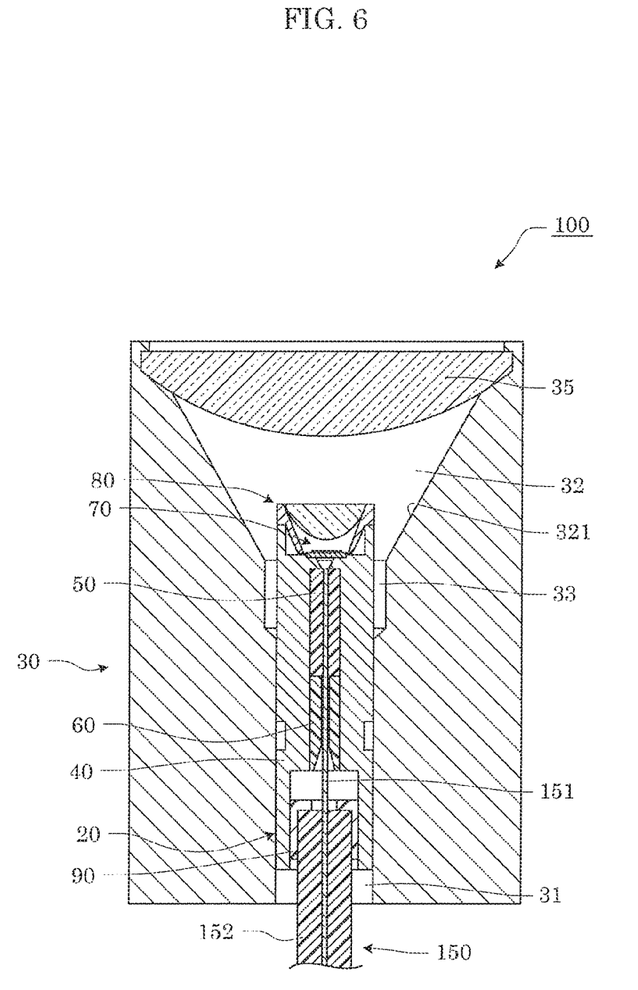
FIG. 6 is a cross sectional view illustrating a positional relationship between a light-emitting module and a heat dissipating lens case different from the positional relationship in the example illustrated in FIG. 3.

FIG. 6 is a cross sectional view illustrating a positional relationship between light-emitting module 20 and heat dissipating lens case 30 different from the positional relationship in the example illustrated in FIG. 3. The positional relationship illustrated in FIG. 6 is such that the distance between light-emitting module 20 and second lens 35 is smaller than in FIG. 3. In such a manner, adjusting the relative positional relationship between light-emitting module 20 and second lens 35 allows adjustment of the distance between light-emitting module 20 and second lens 35, making it possible to control distribution of light released from second lens 35.

Illumination apparatus 100 includes protective cap 200 to be put on light-emitting module 20 when heat dissipating lens case 30 is removed from light-emitting module 20.

Figure 7:
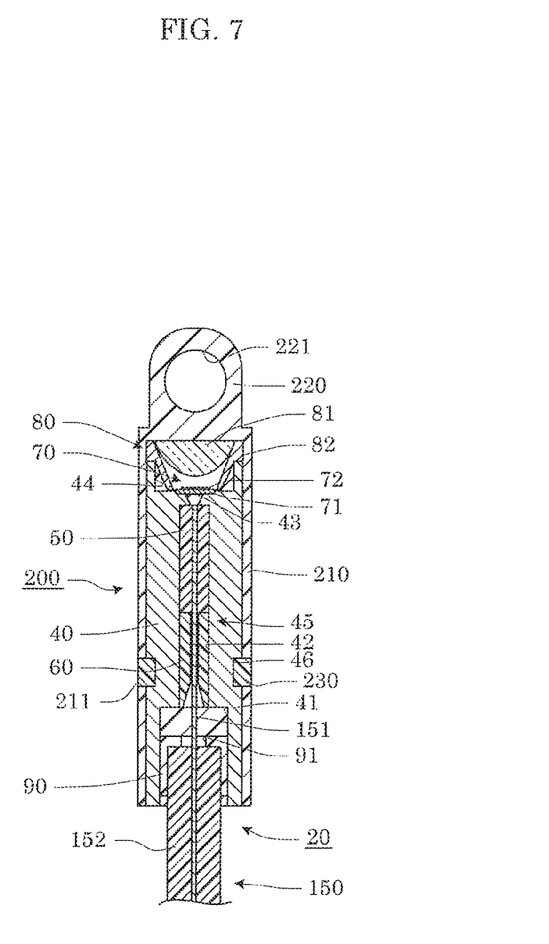
FIG. 7 is a cross sectional view illustrating a protective cap put on a light-emitting module according to an embodiment.
Figure 8:
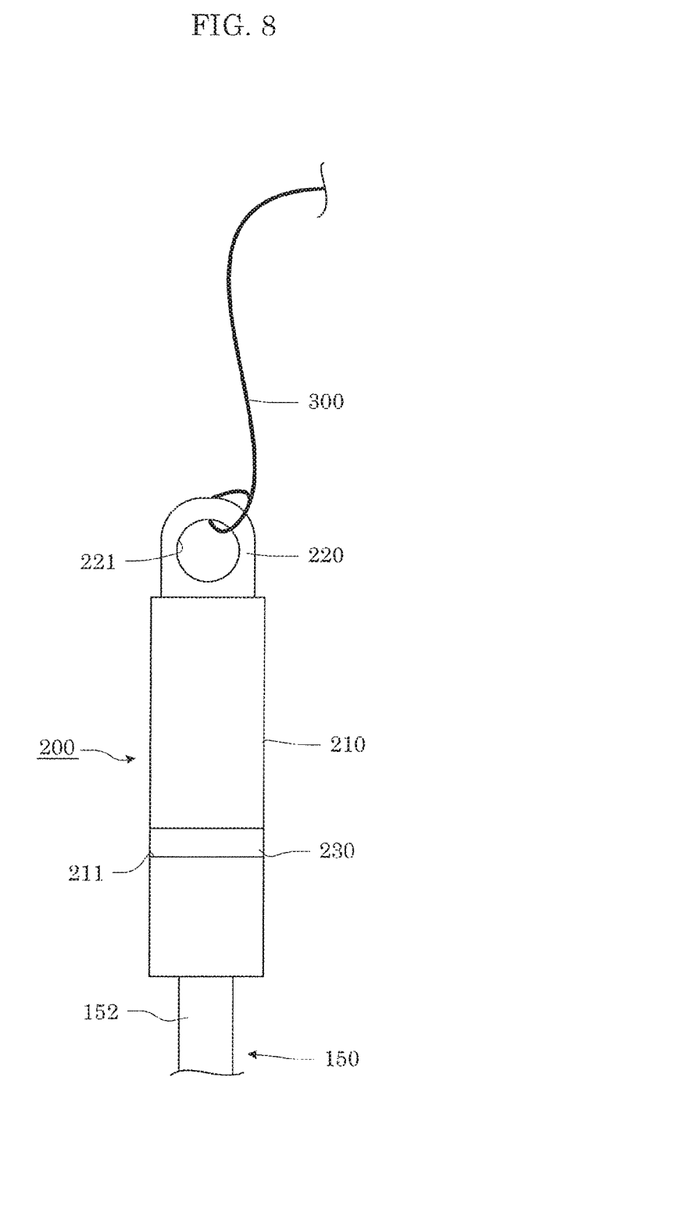
FIG. 8 is a front view illustrating a protective cap put on a light-emitting module according to an embodiment.

FIG. 7 is a cross sectional view illustrating protective cap 200 put on light-emitting module 20 according to an embodiment. FIG. 8 is a front view illustrating protective cap 200 put on light-emitting module 20 according to an embodiment.

As illustrated in FIG. 7 and FIG. 8, protective cap 200 is put on light-emitting module 20 to protect light-emitting module 20. Protective cap 200 is formed using, for example, metal or resin that does not transmit light. Protective cap 200 includes bottomed and tubular cap body 210 and protrusion 220 that protrudes outward from the outer bottom surface of cap body 210.

Light-emitting module 20 is inserted and fitted into cap body 210. Engagement hole 211 which is in communication with depression 46 of housing 40 is formed in the outer peripheral surface of cap body 210. Engagement hole 211 is formed along a portion of the perimeter of cap body 210 in a manner that cap body 210 is not separated. Therefore, engagement hole 211 is framed into an approximate C-shape when viewed along the axial direction. Engagement piece 230 is fitted into engagement hole 211 and depression 46 of housing 40.

Figure 9:
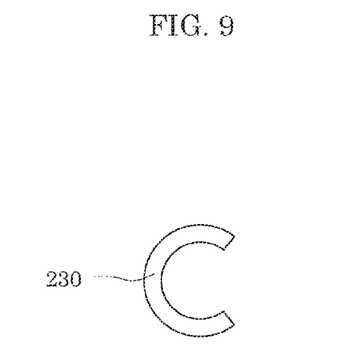
FIG. 9 is a plan view illustrating a schematic configuration of an engagement piece according to an embodiment.

FIG. 9 is a plan view illustrating a schematic configuration of engagement piece 230 according to an embodiment. In FIG. 9, engagement piece 230 is viewed along the axial direction. Like engagement hole 211, engagement piece 230 is formed into an approximate C-shape when viewed along the axial direction, as illustrated in FIG. 9. Engagement piece 230 is formed using, for example, an elastic body such as resin. When engagement piece 230 is fitted into depression 46 of housing 40 and engagement, hole 211 while protective cap 200 is put on light-emitting module 20, engagement piece 230 reduces disconnection of protective cap 200. Removing engagement piece 230 from depression 46 of housing 40 and engagement hole 211 releases the engagement by engagement piece 230, thereby allowing protective cap 200 to be removed from light-emitting module 20.

As illustrated in FIG. 8, protrusion 220 of protective cap 200 has holding hole 221 for holding wiring cable 300. Wiring cable 300 can be attached to protective cap 200 by inserting one end portion of wiring cable 300 through holding hole 221 and tying the one end portion to protrusion 220.

[Operation of Illumination Apparatus]

Next, an operation of illumination apparatus 100 will be described.

The following describes a procedure for installing a plurality of illumination apparatuses 100 on the ceiling and the floor of shop window 301 which is an example of a building structure, for example. First, the worker puts protective cap 200 on light-emitting module 20 attached to a tip portion of optical cable 150. The worker attaches wiring cable 300 to protrusion 220 of protective cap 200. The worker then places light-emitting module 20 at a desired position on shop window 301 while routing optical cable 150, by handling wiring cable 300. At this time, although light-emitting module 20 and protective cap 200 are subject to the restriction of the building structure, a smooth wiring operation is possible because the external sizes of light-emitting module 20 and protective cap 200 are not large as compared to heat dissipating lens case 30. Furthermore, since protective cap 200 covers light-emitting module 20 while the wiring operation is performed, the eye-safe function can be ensured.

When light-emitting module 20 is placed at the desired position, the worker removes protective cap 200 from light-emitting module, 20 and attaches heat dissipating lens case 30 to light-emitting module 20. When doing so, the worker adjusts the relative positional relationship between heat dissipating lens case 30 and light-emitting module 20 to achieve desired light distribution. After the adjustment, heat dissipating lens case 30 and light-emitting module 20 may be fixed as necessary so as to reduce positional misalignment.

When light-emitting module 20 is turned on after the installation, illumination light is released with desired light distribution via second lens 35 of heat dissipating lens case 30. At this time, the heat generated by light-emitting module 20 is dissipated via heat dissipating lens case 30.

Advantageous Effects, Etc

As described above, the illumination apparatus according to the present embodiment is illumination apparatus 100 which is to be connected to light source apparatus 149 that generates laser light and which is to be attached to optical cable 150 that guides the laser light. Illumination apparatus 100 includes: light-emitting module 20 which is to be attached to a tip portion of optical cable 150, receives the laser light emitted from optical cable 150, converts the laser light into light having a different wavelength of a predetermined color, and emits the light; and heat dissipating lens case 30 which holds second lens 35 that controls distribution of the light emitted by light-emitting module 20, and which dissipates heat generated by light-emitting module 20. Heat dissipating lens case 30 has an attachment structure (attachment hole portion 31) which allows heat dissipating lens case 30 to be removably attached to light-emitting module 20.

According to this configuration, heat dissipating lens case 30 is removably attached to light-emitting module 20, and thus heat dissipating lens case 30 can be removed from light-emitting module 20 when illumination apparatus 100 is being installed. Therefore, optical cable 150 to which light-emitting module 20 is attached can be smoothly wired. The size of heat dissipating lens case 30 can be determined without taking into consideration the restrictions of the building structure at the time of installation. That is to say, at least a certain level of heat dissipation performance can be ensured.

These features make it possible to provide an illumination apparatus that increases the workability at the time of installation, while ensuring the heat dissipation performance.

Furthermore, the attachment structure allows adjustment of a relative positional relationship between heat dissipating lens case 30 and light-emitting module 20 after heat dissipating lens case 30 is attached to light-emitting module 20.

According to this configuration, since the relative positional relationship between heat dissipating lens case 30 and light-emitting module 20 can be adjusted, it is possible to adjust the distance between second lens 35 held by heat dissipating lens case 30 and light-emitting module 20. Adjustment of the distance between second lens 35 and light-emitting module 20 makes it possible to control the distribution of light released from second lens 35.

Furthermore, illumination apparatus 100 includes protective cap 200 to be put on light-emitting module 20 when heat dissipating lens case 30 is removed from light-emitting module 20.

According to this configuration, since protective cap 200 is put on light-emitting module 20 when heat dissipating lens case 30 is removed from light-emitting module 20, protective cap 200 can reduce the occurrence of breakage of light-emitting module 20 at the time of the wiring operation. Furthermore, even if the laser light leaks from light-emitting module 20 at the time of the wiring operation, protective cap 200 can reduce further leakage.

Furthermore, protective cap 200 includes holding hole 221 for holding wiring cable 300.

According to this configuration, since holding hole 221 for holding wiring cable 300 is formed in protective cap 200, wiring cable 300 can be attached to protective cap 200 via holding hole 221. Therefore, optical cable 150 can be routed by also using wiring cable 300.

Other Embodiments

Although an illumination apparatus according to the present disclosure has been described based on the above embodiment, the present disclosure is not limited to the above embodiment.

For example, the above embodiment has described, as an example of the attachment structure, attachment hole portion 31 formed in heat dissipating lens case 30. However, the attachment structure may take any form, so long as it allows heat dissipating lens case 30 and light-emitting module 20 to be removably attached to each other. For example, the attachment structure may use screws. When adopting an attachment structure that uses screws, a female screw is formed in the heat dissipating lens case and a male screw that threadedly engages with the female screw is formed in the light-emitting module. In this case, it is possible to increase the area of contact between the heat dissipating lens case and the light-emitting module, and thus the heat dissipation performance can be enhanced.

Furthermore, the attachment structure may allow the heat dissipating lens case to be adjusted along a longitudinal axis of the light-emitting module for adjusting the relative positional relationship between the heat dissipating lens case and the light-emitting module.

The light-emitting module may include a light emitter which converts the laser light into the light having the different wavelength of the predetermined color, the light emitter may be fixed to a portion of the light-emitting module, and the attachment structure may allow a distance between the light-emitting module and the lens to be adjusted by adjusting the heat dissipating lens case along the longitudinal axis of the light-emitting module.

The heat dissipating lens case may include a lens holding hole portion in an end surface of the heat dissipating lens case, the lens holding hole portion may define a truncated cone-shaped opening having a greater diameter at a second end side adjacent the end surface of the heat dissipating lens case than a first end side opposite the second end side, the lens being inside the lens holding hole portion on the second end side, and the attachment structure may allow the light-emitting module to be adjusted at least up to and into the lens holding hole portion of the heat dissipating lens case.

The attachment structure may allow the heat dissipating lens case to be adjusted circumferentially around the light-emitting module for adjusting the relative positional relationship between the heat dissipating lens case and the light-emitting module.

The light-emitting module may include a tubular housing, the attachment structure may include a cylindrical opening in an end surface of the heat dissipating lens case, and the heat dissipating lens case may by removably attached to the light-emitting module by inserting the tubular housing of the light-emitting module into the cylindrical opening of the attachment structure.

The illumination apparatus may further include a protective cap including a second attachment structure, the second attachment structure allowing the heat dissipating lens case to be removably attached to the light-emitting module when the heat dissipating lens case is removed from the light-emitting module.

The second attachment structure may include a cylindrical opening in an end surface of the protective cap, the protective cap may include an engagement piece which protrudes into the cylindrical opening of the second attachment structure, the light-emitting module may include a tubular housing, the tubular housing may include a depression, the protective cap may be removably attached to the light-emitting module by inserting the tubular housing of the light-emitting module into the cylindrical opening of the protective cap, and when the protective cap is attached to the light-emitting module, the engagement piece of the protective cap may be fitted into the depression of the housing.

The engagement piece may include a C-shape when viewed along an axial direction of the protective cap.

The light-emitting module may include a light emitter which converts the laser light into the light having the different wavelength of the predetermined color, and the attachment structure may allow adjustment of a relative positional relationship between the lens of the heat dissipating lens case and the light emitter of the light-emitting module after the heat dissipating lens case is attached to the light-emitting module.

The heat dissipating lens case may include a lens holding hole portion in an end surface of the heat dissipating lens case, the lens holding hole portion may define a truncated cone-shaped opening having a greater diameter at a second end side adjacent the end surface of the heat dissipating lens case than a first end side opposite the second end side, the lens being inside the lens holding hole portion on the second end side, and the attachment structure may allow the light emitter to be adjusted at least up to and into the lens holding hole portion of the heat dissipating lens case.

The light-emitting module may include a tubular housing, the heat dissipating lens case may include an intermediate hole portion, the intermediate hole portion being a cylindrical opening in communication with the lens holding hole portion, and a diameter of the intermediate hole portion may by greater than a diameter of the tubular housing of the light-emitting module.

The heat dissipating lens case may include an attachment hole portion, the attachment hole portion may be the attachment structure and include a cylindrical opening in an end surface of the heat dissipating lens case at the first end side, and a diameter of the attachment hole portion may by less than the diameter of the intermediate hole portion.

The lens holding hole portion, the intermediate hole portion, and the attachment hole portion of the heat dissipating lens case may be arranged along a same axis.

An end portion of the intermediate hole portion may include a taper-down shape, the taper-down shape interconnecting the intermediate hole portion and the attachment hole portion.

The light-emitting module may include a housing, and the housing of the light-emitting module and the heat dissipating lens case may each include a thermally conductive material.

The light-emitting module may include a light emitter which converts the laser light into the light having the different wavelength of the predetermined color, and the light emitter may by in contact with the housing of the light-emitting module for dissipating heat.

While the foregoing has described one or more embodiments and/or other examples, it is understood that various modifications may be made therein and that the subject matter disclosed herein inn be implemented in various forms and examples, and that they may be applied in numerous applications, only some of which have been described herein. It is intended by the following claims to claim any and all modifications and variations that fall within the true scope of the present teachings.

What is claimed is:

1. An illumination apparatus which is to be connected to a light source apparatus that generates laser light and which is to be attached to an optical cable that guides the laser light, the illumination apparatus comprising:
   a light-emitting module which is to be attached to a tip portion of the optical cable, receives the laser light emitted from the optical cable, converts the laser light into light having a different wavelength of a predetermined color, and emits the light; and a heat dissipating lens case which includes a lens and dissipates heat generated by the light-emitting module, the lens controlling distribution of the light emitted by the light-emitting module, wherein the heat dissipating lens case includes first attachment structure which allows the heat dissipating lens case to be removably attached to the light-emitting module by pushing and pulling of the light-emitting module, the first attachment structure allows, by the pushing and pulling of the light-emitting module, adjustment of a relative positional relationship between the heat dissipating lens case and the light-emitting module after the heat dissipating lens case is attached to the light-emitting module, and the illumination apparatus further comprises a protective cap including a second attachment structure, the second attachment structure allowing the protective cap to be removably attached to the light-emitting module when the heat dissipating lens case is removed from the light-emitting module.

2. The illumination apparatus according to claim 1, wherein
the first attachment structure allows the heat dissipating lens case to be adjusted along a longitudinal axis of the light-emitting module for adjusting the relative positional relationship between the heat dissipating lens case and the light-emitting module.

3. The illumination apparatus according to claim 2, wherein
the light-emitting module includes a light emitter which converts the laser light into the light having the different wavelength of the predetermined color,
the light emitter is fixed to a portion of the light-emitting module, and
the first attachment structure allows a distance between the light-emitting module and the lens to be adjusted by adjusting the heat dissipating lens case along the longitudinal axis of the light-emitting module.

4. The illumination apparatus according to claim 2, wherein
the heat dissipating lens case includes a lens holding hole portion in an end surface of the heat dissipating lens case,
the lens holding hole portion defines a truncated cone-shaped opening having a greater diameter at a second end side adjacent the end surface of the heat dissipating lens case than a first end side opposite the second end side, the lens being inside the lens holding hole portion on the second end side, and
the first attachment structure allows the light-emitting module to be adjusted at least up to and into the lens holding hole portion of the heat dissipating lens case.

5. The illumination apparatus according to claim 1, wherein
the first attachment structure allows the heat dissipating lens case to be adjusted circumferentially around the light-emitting module for adjusting the relative positional relationship between the heat dissipating lens case and the light-emitting module.

6. The illumination apparatus according to claim 5, wherein
the light-emitting module includes a tubular housing,
the first attachment structure includes a cylindrical opening in an end surface of the heat dissipating lens case, and
the heat dissipating lens case is removably attached to the light-emitting module by inserting the tubular housing of the light-emitting module into the cylindrical opening of the first attachment structure.

7. The illumination apparatus according to claim 1, wherein
the protective cap includes a holding hole for holding a wiring cable.

8. The illumination apparatus according to claim 1, wherein
the second attachment structure includes a cylindrical opening in an end surface of the protective cap,
the protective cap includes an engagement piece which protrudes into the cylindrical opening of the second attachment structure,
the light-emitting module includes a tubular housing,
the tubular housing includes a depression,
the protective cap is removably attached to the light-emitting module by inserting the tubular housing of the light-emitting module into the cylindrical opening of the protective cap, and
when the protective cap is attached to the light-emitting module, the engagement piece of the protective cap is fitted into the depression of the housing.

9. The illumination apparatus according to claim 8, wherein
the engagement piece includes a C-shape when viewed along an axial direction of the protective cap.

10. The illumination apparatus according to claim 1, wherein
the light-emitting module includes a light emitter which converts the laser light into the light having the different wavelength of the predetermined color, and
the first attachment structure allows adjustment of a second relative positional relationship between the lens of the heat dissipating lens case and the light emitter of the light-emitting module after the heat dissipating lens case is attached to the light-emitting module.

11. The illumination apparatus according to claim 10, wherein
the heat dissipating lens case includes a lens holding hole portion in an end surface of the heat dissipating lens case,
the lens holding hole portion defines a truncated cone-shaped opening having a greater diameter at a second end side adjacent the end surface of the heat dissipating lens case than a first end side opposite the second end side, the lens being inside the lens holding hole portion on the second end side, and
the first attachment structure allows the light emitter to be adjusted at least up to and into the lens holding hole portion of the heat dissipating lens case.

12. The illumination apparatus according to claim 11, wherein
the light-emitting module includes a tubular housing,
the heat dissipating lens case includes an intermediate hole portion, the intermediate hole portion being a cylindrical opening in communication with the lens holding hole portion, and
a diameter of the intermediate hole portion is greater than a diameter of the tubular housing of the light-emitting module.

13. The illumination apparatus according to claim 12, wherein
the heat dissipating lens case includes an attachment hole portion, the attachment hole portion is the first attachment structure and includes a cylindrical opening in an end surface of the heat dissipating lens case at the first end side, and a diameter of the attachment hole portion is less than the diameter of the intermediate hole portion.

14. The illumination apparatus according to claim 13, wherein the lens holding hole portion, the intermediate hole portion, and the attachment hole portion of the heat dissipating lens case are arranged along a same axis.

15. The illumination apparatus according to claim 14, wherein an end portion of the intermediate hole portion includes a taper-down shape, the taper-down shape interconnecting the intermediate hole portion and the attachment hole portion.

16. The illumination apparatus according to claim 1, wherein the light-emitting module includes a housing, and the housing of the light-emitting module and the heat dissipating lens case each comprise a thermally conductive material.

17. The illumination apparatus according to claim 16, wherein the light-emitting module includes a light emitter which converts the laser light into the light having the different wavelength of the predetermined color, and the light emitter is in contact with the housing of the light-emitting module for dissipating heat.

* * * * *